US012143559B2

(12) United States Patent
Ragan et al.

(10) Patent No.: US 12,143,559 B2
(45) Date of Patent: **\*Nov. 12, 2024**

(54) PROVIDING A CONTIGUOUS VIRTUAL SPACE FOR A PLURALITY OF DISPLAY DEVICES

(71) Applicant: Sphere Entertainment Group, LLC, New York, NY (US)

(72) Inventors: Matthew Ragan, New York, NY (US); Kurt Kaminski, Oakland, CA (US)

(73) Assignee: Sphere Entertainment Group, LLC, New York, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 17/201,949

(22) Filed: Mar. 15, 2021

(65) Prior Publication Data

US 2021/0203908 A1  Jul. 1, 2021

Related U.S. Application Data

(63) Continuation of application No. 16/512,214, filed on Jul. 15, 2019, now Pat. No. 10,951,877.

(51) Int. Cl.
*H04N 13/243* (2018.01)
*H04N 13/25* (2018.01)
(Continued)

(52) U.S. Cl.
CPC .......... *H04N 13/243* (2018.05); *H04N 13/25* (2018.05); *H04N 13/275* (2018.05); *H04N 13/282* (2018.05)

(58) Field of Classification Search
CPC .... H04N 13/243; H04N 13/25; H04N 13/275; H04N 13/282
(Continued)

(56) References Cited

U.S. PATENT DOCUMENTS 6,152,739 A  11/2000  Amery et al.
7,737,910 B2  6/2010  Kulkarni et al.
(Continued)

FOREIGN PATENT DOCUMENTS

JP  2012531668 A  12/2012
JP  2016066149 A  4/2016
(Continued)

OTHER PUBLICATIONS

International Search Report and Written Opinion of the International Searching Authority directed to related International Patent Application No. PCT/US20/40414, mailed Sep. 28, 2020; 16 pages.
(Continued)

*Primary Examiner* — Matthew K Kwan
(74) *Attorney, Agent, or Firm* — Sterne, Kessler, Goldstein & Fox P.L.L.C.

(57) ABSTRACT

Disclosed herein are system, method, and computer program product embodiments for rendering a contiguous virtual space for a plurality of display devices. An embodiment operates by identifying a projection of a virtual camera onto a virtual plane and determining a display plane area based on an intersection of the projection of the virtual camera onto the virtual plane. Thereafter, a position for a plurality of virtual windows correlating to a plurality of real-world display devices on the display plane area is calculated based on (i) properties of the display devices and (ii) a focal length of the virtual camera. After placing the virtual windows their respective display plane area positions, content behind a virtual window is identified and provided to the corresponding real-world display device.

23 Claims, 9 Drawing Sheets

(51) Int. Cl.
*H04N 13/275* (2018.01)
*H04N 13/282* (2018.01)

(58) Field of Classification Search
USPC .......................................................... 348/47
See application file for complete search history.

(56) References Cited

U.S. PATENT DOCUMENTS

| | | | |
|---|---|---|---|
| 8,311,275 | B1 | 11/2012 | Berlic et al. |
| 10,951,877 | B2 | 3/2021 | Ragan et al. |
| 2005/0125488 | A1* | 6/2005 | Kulkarni ............... G06F 3/1438 709/201 |
| 2009/0237492 | A1* | 9/2009 | Kikinis ............... H04N 13/296 348/46 |
| 2010/0328346 | A1 | 12/2010 | Watson |
| 2010/0328447 | A1 | 12/2010 | Watson |
| 2012/0188637 | A1 | 7/2012 | Joseph et al. |
| 2016/0104313 | A1 | 4/2016 | Du et al. |
| 2016/0165215 | A1* | 6/2016 | Gu ......................... G06T 17/00 348/43 |
| 2018/0322682 | A1 | 11/2018 | Dimitrov et al. |
| 2019/0156553 | A1 | 5/2019 | O'Brien |
| 2019/0361657 | A1* | 11/2019 | Einecke ................. G09G 5/12 |
| 2021/0021800 | A1 | 1/2021 | Ragan et al. |

FOREIGN PATENT DOCUMENTS

| | | |
|---|---|---|
| JP | 2016528579 A | 9/2016 |
| WO | 2010151511 A1 | 12/2010 |
| WO | WO 2018/150355 A1 | 8/2018 |

OTHER PUBLICATIONS

Extended European Search Report directed to related European Application No. 20841459.9, mailed Jun. 23, 2023; 8 pages.

* cited by examiner

PROVIDING A CONTIGUOUS VIRTUAL SPACE FOR A PLURALITY OF DISPLAY DEVICES

CROSS-REFERENCE TO RELATED APPLICATIONS

The present application is a continuation of U.S. patent application Ser. No. 16/512,214, filed Jul. 15, 2019, now U.S. Pat. No. 10,951,877, which is incorporated herein by reference in its entirety.

BACKGROUND

Videos are traditionally displayed in large forums on multiple real-world display devices. In doing so, systems are utilized to illustrate the movement of content in the videos across the real-world display devices. However, prior systems have mismanaged providing the content of the videos to the real-world display devices in a cohesive fashion. For example, prior systems have relied on specific hardware and software requirements for storing, generating and rendering the necessary content provided in the videos. As such, prior systems have been unable to readily adapt to different numbers and/or configurations of display devices. Moreover, prior systems have faced difficulty in providing movement of objects in videos across the real-world display devices without noticeable delay therebetween.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a contiguous virtual space for a plurality of display devices.

The present disclosure describes a system for presenting a video across multiple real-world display devices. In the past, such systems would determine, generate and transmit unique files to the real-world display devices for them to present their portion of the video. However, the prior underlying processes relied on the storage and computational capabilities of the systems and real-world display devices. Specifically, for example, the system is required to have sufficient storage and computational capabilities for processing each of the unique files, and the real-world display devices are required to playback the received files. Moreover, prior systems are unable to provide automation around the placement of the display devices in the real world and to process virtual scenes based on this placement such that the content is presented across real-world display devices in a cohesive fashion.

In some embodiments, when presenting a video, current systems provide virtual windows on a virtual plane in a virtual environment based on their corresponding real-world display devices (e.g., a number and configuration). In doing so, the systems provide a virtual camera in the virtual environment in a position and location that allows it to focus onto each of the virtual windows and identify objects (e.g., content in the video) presented therein. As such, current systems are able to identify and send data of the virtual windows to their respective real-world display devices.

By operating in such a fashion, unlike prior systems, embodiments described herein are able to provide the real-world display devices with the appropriate data to present content in the virtual environment from a shared camera perspective. In doing so, current systems are able to present content across the real-world display devices in a cohesive fashion.

For example, in some embodiments, current system can relay a video of a real-world concert to multiple real-world display devices. In doing so, the system can create virtual windows in the virtual world representing the real-world display devices and define a virtual plane area surrounding the virtual windows. The system presents scenes of the video within the virtual plane area. And in turn, the system determines spatial position of the objects with respect to the virtual windows and transmits only required data of the particular virtual window to the associated real-world display device. By operating in such a fashion, the system is able to present objects moving within the scenes in a cohesive fashion that more closely resembles the real world. And, the system is able to only send the data that the particular real-world display devices needs to display.

Figure 1:
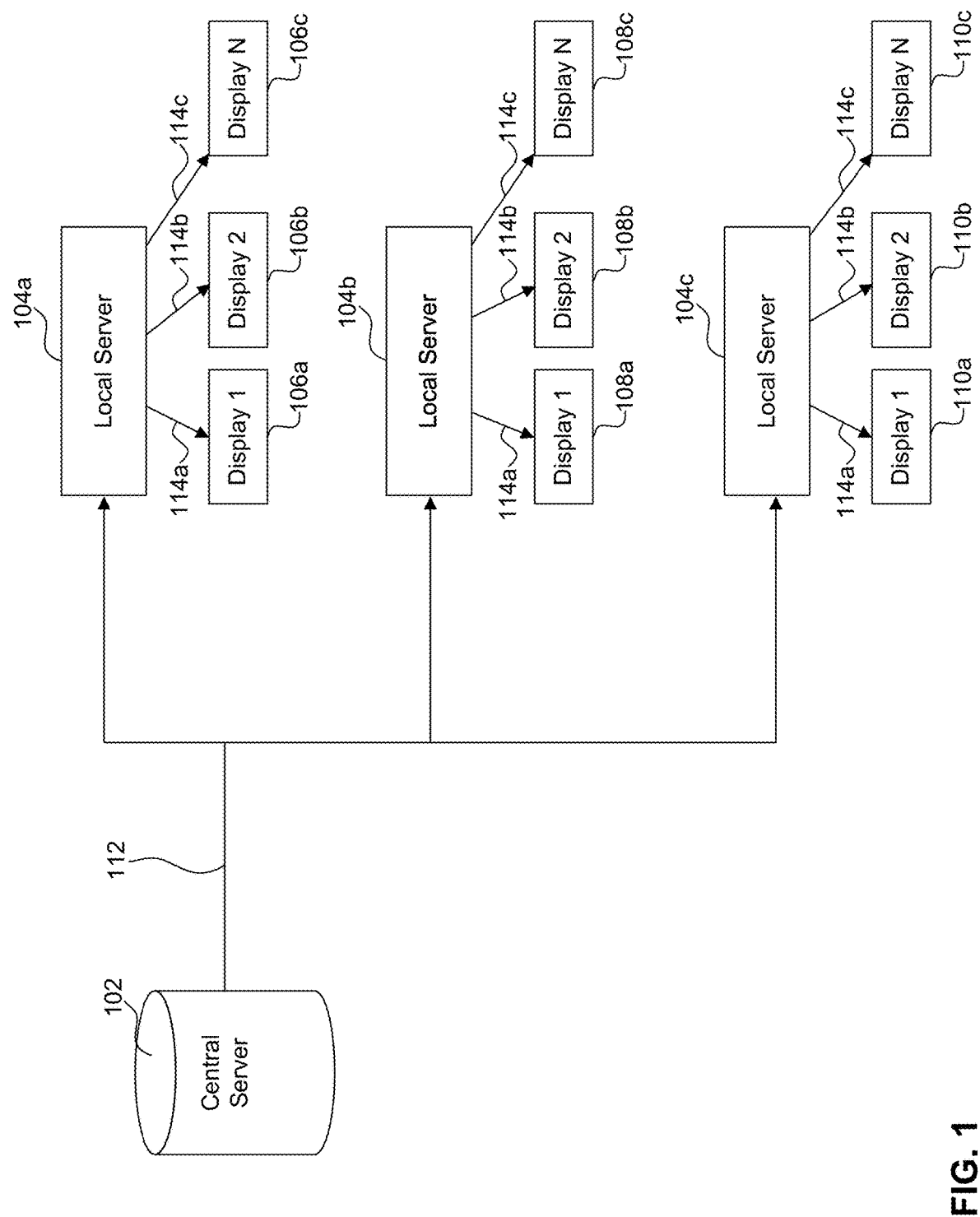
FIG. 1 illustrates a block diagram of a system providing a contiguous virtual space for a plurality of display devices, according to some embodiments.

FIG. 1 illustrates a block diagram of a system 100 for providing a contiguous virtual space for a plurality of display devices. The system 100 includes a central server 102, one or more local servers 104, and one or more real-world display devices 106, 108 and 110. The central server 102 is in communication with the local servers 104, which is in communication with their respective display devices 106. These servers and/or devices may be managed and/or provided by the same entity or different entities. For example, the central server 102 may be managed and/or provided by a third party entity, and the local servers 104 and the display devices 106 may be managed and/or provided by an organization and/or company.

The central server 102 is in communication with the local servers 104 over a communication line or medium 112. In turn, the local servers 104 is in communication with the display devices 108 over a communication line or medium 114. The communication lines or mediums 112 and 114 may be private or public.

As such, the central server 102 stores and/or provides a video file for the display devices 106, 108 and 110 to playback. As such, the central server 102 may receive the video file from an external source. And the central server 102 can act as a distributed playback system in providing the video file to the display devices 106, 108 and 110. The video file may contain a replicated real-world environment. Examples of video files containing replications of a real-world event include a live recording of a real-world event (e.g., a live concert) or a previously recorded real-world event (e.g., the television show "Numb3rs").

The central server 102 then identifies content to be presented on the display devices 106, 108 and 110. The content may include a scene (e.g., a sequence of continuous action), which may then include one or more objects. Accordingly, the scene and/or objects may occur in real life or extended reality (e.g., augmented reality, a mixed reality, and/or a virtual reality). Along these lines, the video file's scene and/or objects are two-dimensional.

As discussed above, the central server 102 is in communication with local servers 104, which is in communication with sets of display devices 106, 108 and 110. For example, the local server 104a may be in communication with a first set of display devices 106, the local server 104b may be in communication with a second set of display devices 108, and the local server 104c may be in communication a third set of display devices 110. As such, the local servers 104 and the sets of display devices 106, 108 and 110 may be provided at different locations (e.g., in a building). In turn, each set of the display devices 106, 108 and 110 presents the same video file. And each respective display device is in sync with each other (e.g., display devices 106a, 108a and 110a).

Accordingly, depending on the number of sets of display devices 106, 108 and 110, the central server 102 and/or the local servers 104 perform the appropriate processing to contiguously and synchronously present scenes from the video file. As would be understood by a person of ordinary skill in the art, scenes represents a crop of a video file.

For example, if there is only a single set of display devices (e.g., display devices 106), the central server 102 or the local server 104a may perform the processing, or they may act as a single server in doing so. However, if there are multiple sets of display devices 106, 108 and 110 (e.g., display devices 106 and 108), the central server 102 sends copies of data from the original video file to the local servers 104 (e.g., local servers 104a and 104b). As such, the time data is streamed continuously. The local servers 104 thereafter perform the processing along with the timing data so that corresponding display devices from different sets (e.g., display devices 106a and 108a) present the central server 102's video file in sync.

For the sake of simplicity, the following disclosure will discuss the central server 102 as performing the processing steps. However, in view of the aforementioned, a person of ordinary skill would readily understand that depending on the number of sets of display devices 106, 108 and 110, the central server 102 and/or the local servers 104 may perform the processing steps.

The central server 102 receives data relating to properties of each set of the display devices 106, 108 and 110 themselves or relationships therebetween. The data is pre-stored and may be manually provided by an authorized individual. Example data relating to each of the display devices 106, 108 and 110 include a geographical position on a defined real-world plane (e.g., a specific location on a wall), a display resolution (e.g., 720p, 1080p, 2K, etc.), a physical size (e.g., 32 inches, 50 inches, 60 inches, etc.), a viewing distance (e.g., 6.3-10.4 feet, 6.9-11.5 feet, 7.5-12.5 feet, and 8.1-13.5 feet, etc.), a technology type (e.g., a liquid crystal display (LCD), an organic light-emitting diode display (OLED), a plasma display panel (PDP), etc.), and a display type (e.g., two-dimensional). Example data relating to relationships between the display devices 106, 108 and 110 in each set include a distance between each of the display devices 106, 108 and 110 in each set. For example, a distance between the adjacent display devices 106a, 106b, and 106c.

Figure 2:
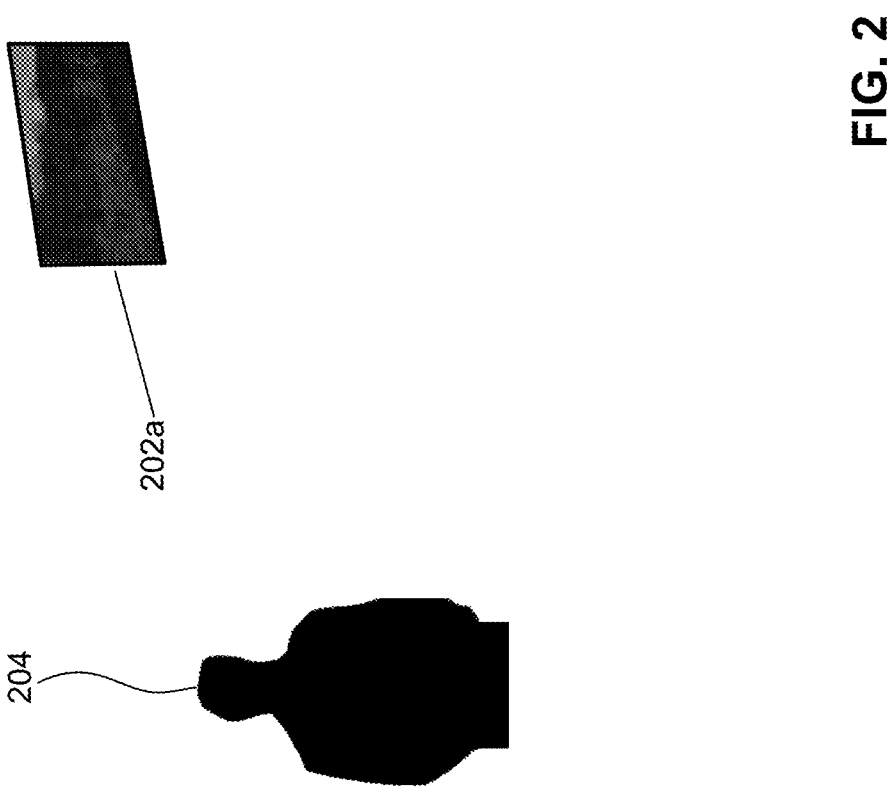
FIG. 2 illustrates a plurality of display devices displaying a contiguous virtual space, according to some embodiments.

Based on the distance between the adjacent display devices 106, 108 and 110 and the size of the display devices 106, 108 and 110, the central server 102 determines a configuration of the display devices 106, 108 and 110 (e.g., a number of rows and columns). FIG. 2 illustrates an example spatial configuration three display devices 202 in a single row which provide a contiguous virtual space for viewers 204. However, other configurations are possible as would be evident to one skilled in the art.

Referring back to FIG. 1, to provide the contiguous virtual space, the central server 102 identifies a portion (e.g., a video crop) of the video file to be presented to the display devices 106, 108 and 110. As mentioned above, the video file may be of a real-world environment or a virtual environment. Accordingly, the central server 102 places a virtual camera at a position and/or location in the replicated real-world environment or in the virtual environment.

Figure 3A:
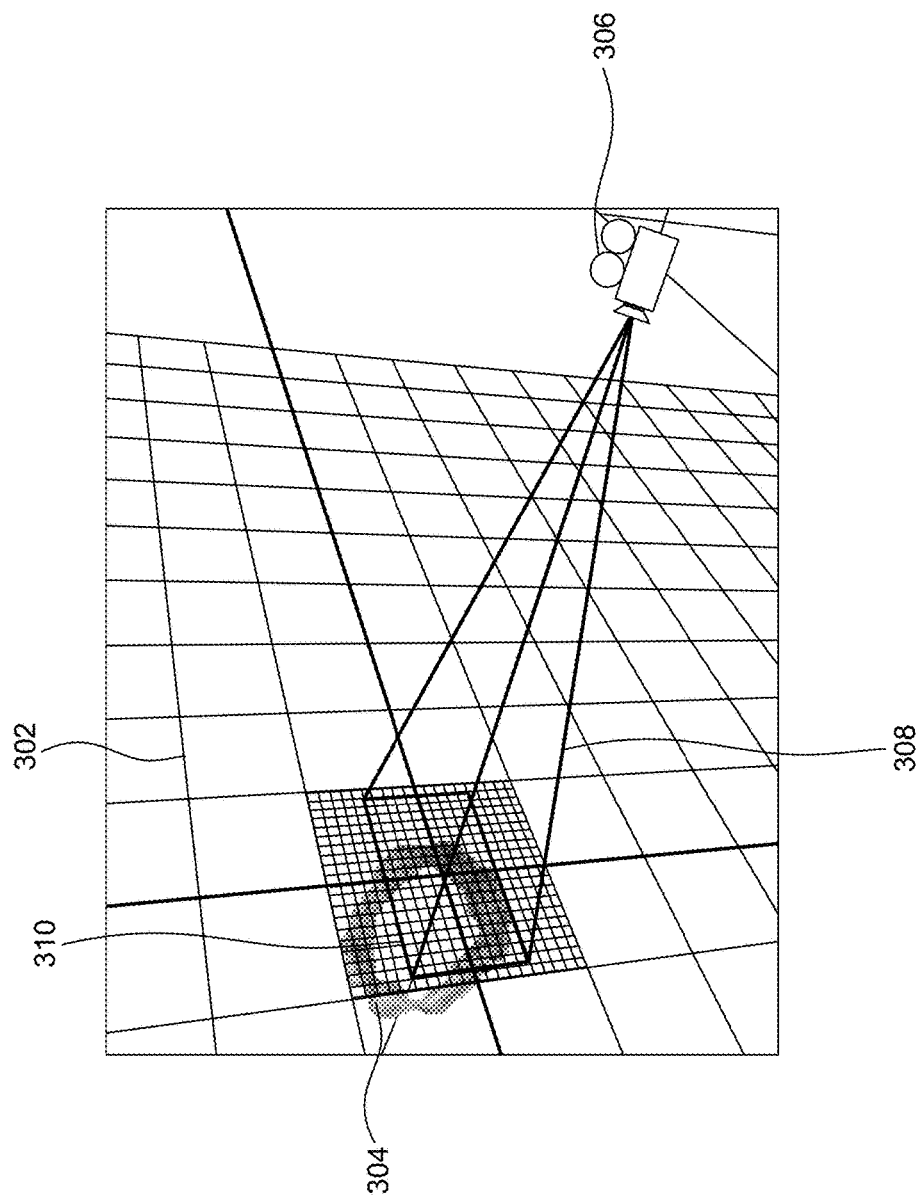
FIGS. 3A, 3B, 4A, and 4B illustrate perspective views of a virtual camera projecting into a virtual space, according to some embodiments.
Figure 3B:
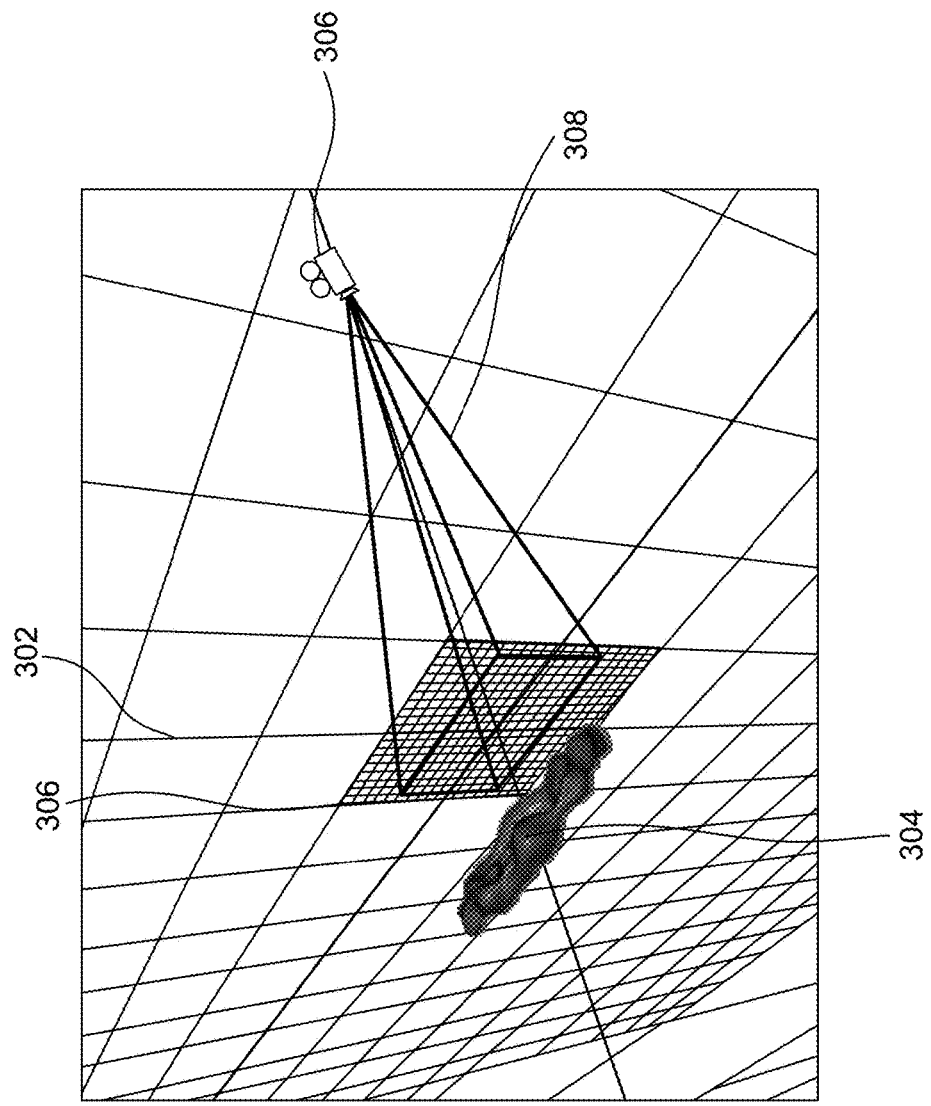

Referring now to FIGS. 3A and 3B, the central server 102 (illustrated in FIG. 1) may then provide a virtual plane 302 in a virtual environment 300 of the portion of the video clip. In some embodiments, multiple virtual planes 302 may be provided in the virtual environment 300. The virtual planes 302 are physically separate from each other. As such, the virtual planes may be on different axes. Along these lines, one virtual plane may run parallel to the y axis, and another virtual plane may run parallel to the x-axis. As will be discussed in more detail below, the virtual planes 302 are associated with their own virtual cameras 306 and virtual plane areas 310. Moreover, each of the virtual planes 302 may correspond to a set of real-world display devices 106, 108, and 110. For example, one virtual plane may correspond to a first set of real-world display devices 106, and a second virtual plane may correspond to a second set of real-world display devices 108.

FIG. 3A illustrates a perspective, front view of the virtual plane 302 in the replicated environment 300. FIG. 3B illustrates a perspective, rear view of the virtual plane 302 in the replicated environment 300. The replicated environment 300 includes an object 304. As such, the virtual plane 302 is positioned at least partially in front of the object 304. As the scene of the video may be two- or the three-dimensional, the replicated environment 300 and/or the object 304 may also be two- or three-dimensional, and the object may be a real-world or virtual object.

The central server 102 (shown in FIG. 1) then identifies the virtual plane 302 and places a virtual camera 306 in the replicated environment 300. The virtual camera 306 provides a projection 308 onto the virtual plane 302, which captures at least a portion of the object 304. As such, the virtual camera 306's projection 308 intersects with the virtual plane 302. In doing so, the intersection defines a display plane area 310 on the virtual plane 302. Along these lines, the virtual camera 306's projection 308 may be of any closed shape and define a shape of the display plane area 310 on the virtual plane 302. For example, as illustrated, the projection 308's shape may be a rectangular frustum, and the display plane area 310's shape may be a rectangle. The display plane area 310's shape may be a rectangular regardless of the shape of the real-world display. For example, if the real-world display is a square (i.e., sides having equal length), the display plan area 310 is still a rectangular.

The display plane area 310 may be at any location on the virtual plane 302. The display plane area 310 may be entirely in front of the object 304. As will be described in more detail below, the size of display plane area 310 is based on the virtual camera 306's projection 308, the number of virtual windows on the virtual plane 302, and/or the configuration of the virtual windows in the virtual plane 302.

Figure 4A:
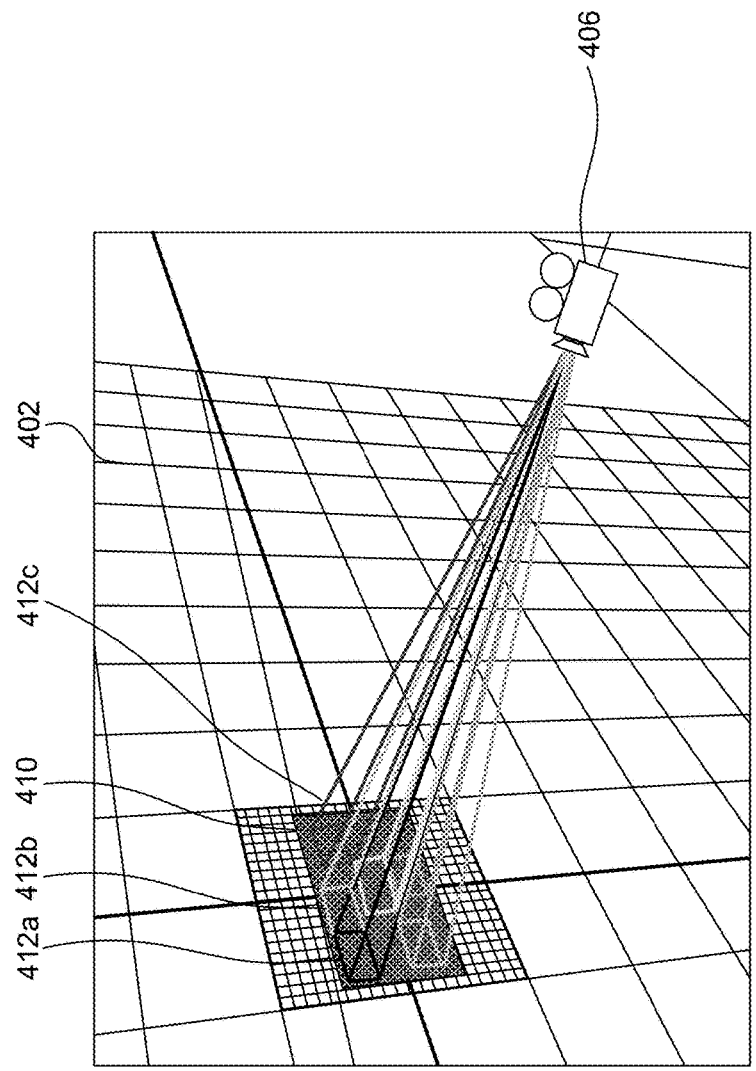
Figure 4B:
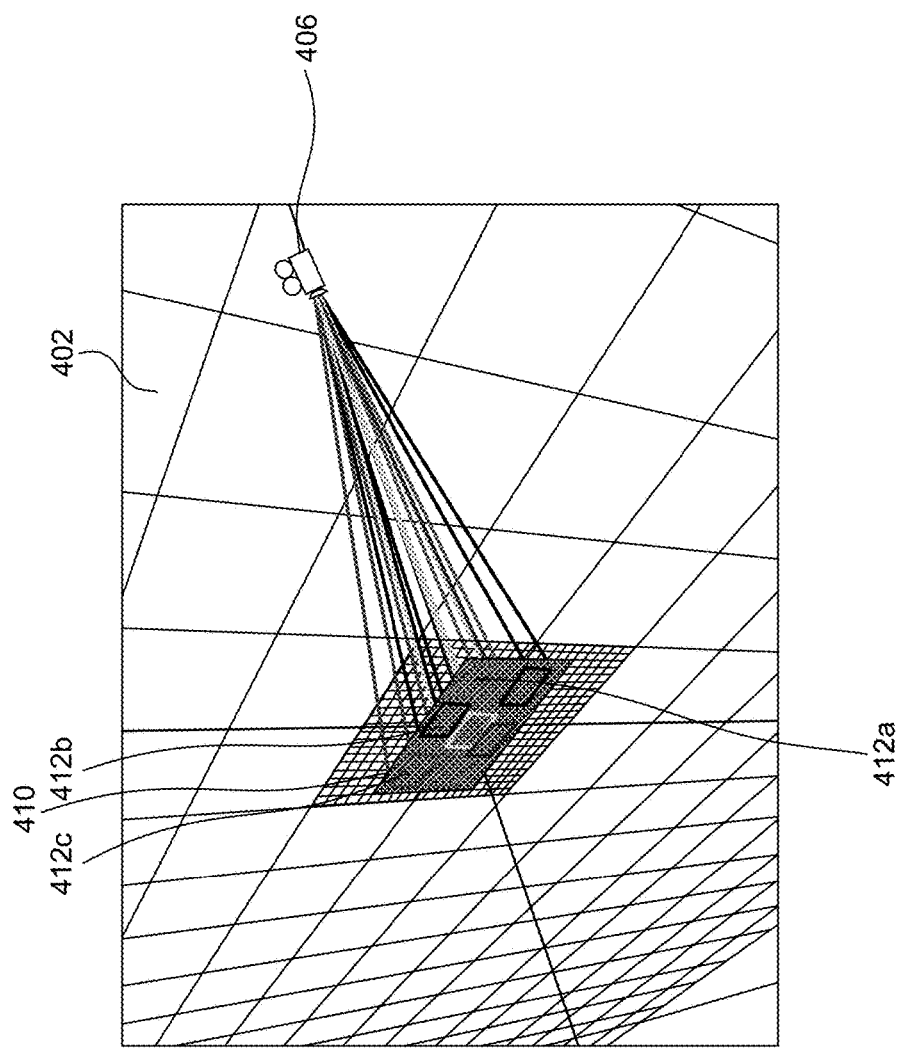

As such, the virtual camera 306's projection 308 onto the virtual plane 302 defines the display plane area 310. And the display plane area 310 defines a location that the virtual windows must be situated of the provides various fields of view based on the size of the display plane area 310 and the distance of the camera 302 to the virtual plane 302. For example, the field of view may equal arctan (0.5×(a width of the display plane area 310/a distance of the virtual camera 306 to the display plane area 310))×2. Referring now to FIGS. 4A and 4B, a plurality of virtual windows 412 on a virtual plane 402 in a replicated environment 300 (e.g., a replicated real-world or virtual environment) of the portion of the video clip are illustrated. FIG. 4A illustrates a perspective, front view of the virtual plane 402 in the replicated environment 400. FIG. 4B illustrates a perspective, rear view of the virtual plane 402 in the replicated environment 400. As stated above, the virtual windows 412 corresponds and has a one-to-one correlation to particular display devices in each set of real-world display devices 106, 108 and 110 (depicted in FIG. 1). For example, the virtual window 412a may correspond to display device 106a, 108a, and/or 110a, the virtual window 412b may correspond to display devices 106b, 108b, and/or 110b, and the virtual window 412c may correspond to display devices 106c, 108c, and/or 110c.

The virtual windows 412 have a two-dimensional spatial location (e.g., a x and y position) within the virtual plane 402. In some embodiments, the spatial location of the virtual windows 412 within in the virtual plane 402 is based on the spatial location of the real-world display devices 106, 108 and 110 (of FIG. 1) in the real world and the characteristics of the real-world display devices 106, 108 and 110. This allows recreation of real-world displays in the virtual world. For example, if the real-world display devices 106, 108 and 110 have a specific spatial location in the real world, the spatial placement of the virtual windows 412 in the virtual world is be based thereon. In other embodiments, the spatial location of the real-world display devices 106, 108 and 110 is based on the spatial location of the virtual windows 412. For example, the virtual windows 412 have a specific spatial location in the virtual world, the spatial location of the real-world display devices 106, 108 and 110 in the real world is based thereon. As such, in either of these embodiments, the virtual world has units analogous to real-world units. For instance, 1 virtual world unit may be analogous to a specific number of inches in the real world (e.g., 1 inch, 3 inches, 6 inches, or 12 inches).

By operating in such a fashion, the virtual camera 402 may represent an imaginary camera in the real-world that has the same spatial relationship to the real-world display devices 106, 108, and 110 as the virtual camera 402 in the virtual environment with respect to the virtual windows 412.

As described above, the virtual camera 406 provides a projection onto one of the virtual planes 402, and the projection determines a display plane area 410. Along these lines, the virtual windows 412 are placed within at least a portion of the display plane area 410. Accordingly, the virtual camera 406 is able to focus its projection onto each of the virtual windows 412. Thus, as content (e.g., object 304 of FIG. 3A) is provided in a virtual environment 400 and behind the virtual windows 412, the virtual camera 406 captures a view of the virtual windows 412 including the object, which is then be provided to the corresponding display devices 106, 108 and 110 (shown in FIG. 1).

Moreover, as stated above, the size of display plane area 410 depends on the virtual camera 406's projection, the number of virtual windows 412 on the virtual plane 402, and/or the configuration of the virtual windows 412 on the virtual plane 402. As such, the virtual camera 406's field of view provided by the projection, and the size of the display plane area 410, depends on the virtual windows 412's size and configuration. For example, the display area plane 410 may have a size that is at least equal to, or greater than, the configuration of the virtual windows 412 (e.g., 1 (rows)×3 (columns)). As such, the virtual windows 412 are calibrated based a size of the display plane area 410, a size of each of the plurality of virtual windows 412 and/or a focal length of the virtual camera 406.

Moreover, after determining the location of the virtual camera 406 relative the display plane area 410 and/or the virtual windows, a plurality of child virtual camera may be provided for the virtual camera 406. As such, the virtual camera 406 may be considered the master virtual camera. Accordingly, the virtual camera 406 (or the master virtual camera) may determine the capabilities of the child virtual cameras (e.g., viewing distance, focus, clarity, etc.). As such, the child cameras may inherit the properties of the virtual camera 406.

Along these lines, each of the child virtual cameras may correspond to one of the virtual windows 412. Thus, since the virtual windows 412 correspond to the real-world display devices 106, 108, 110 (of FIG. 1), the child virtual cameras may also correspond to the real-world display devices 106, 108, 110. And each of the child virtual cameras may correspond to a particular real-world display devices. For example, the child virtual cameras may have a 1:1 ratio with the real-world display devices. As such, the child virtual cameras may provide data relating to content in their corresponding virtual windows 412.

Figure 5:
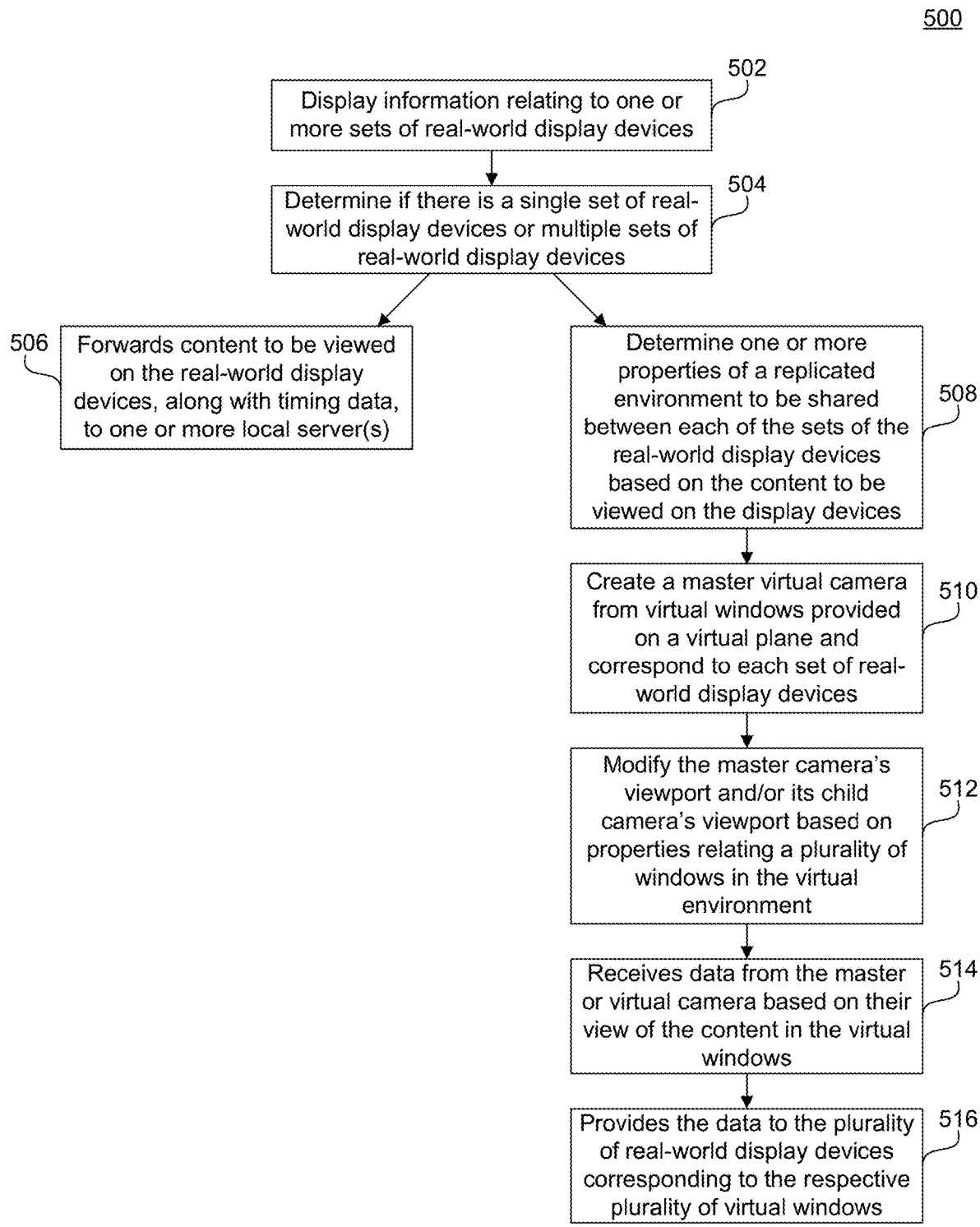
FIGS. 5 and 6 illustrate a flowchart illustrating a process for providing a contiguous virtual space, according to some embodiments.
Figure 6:
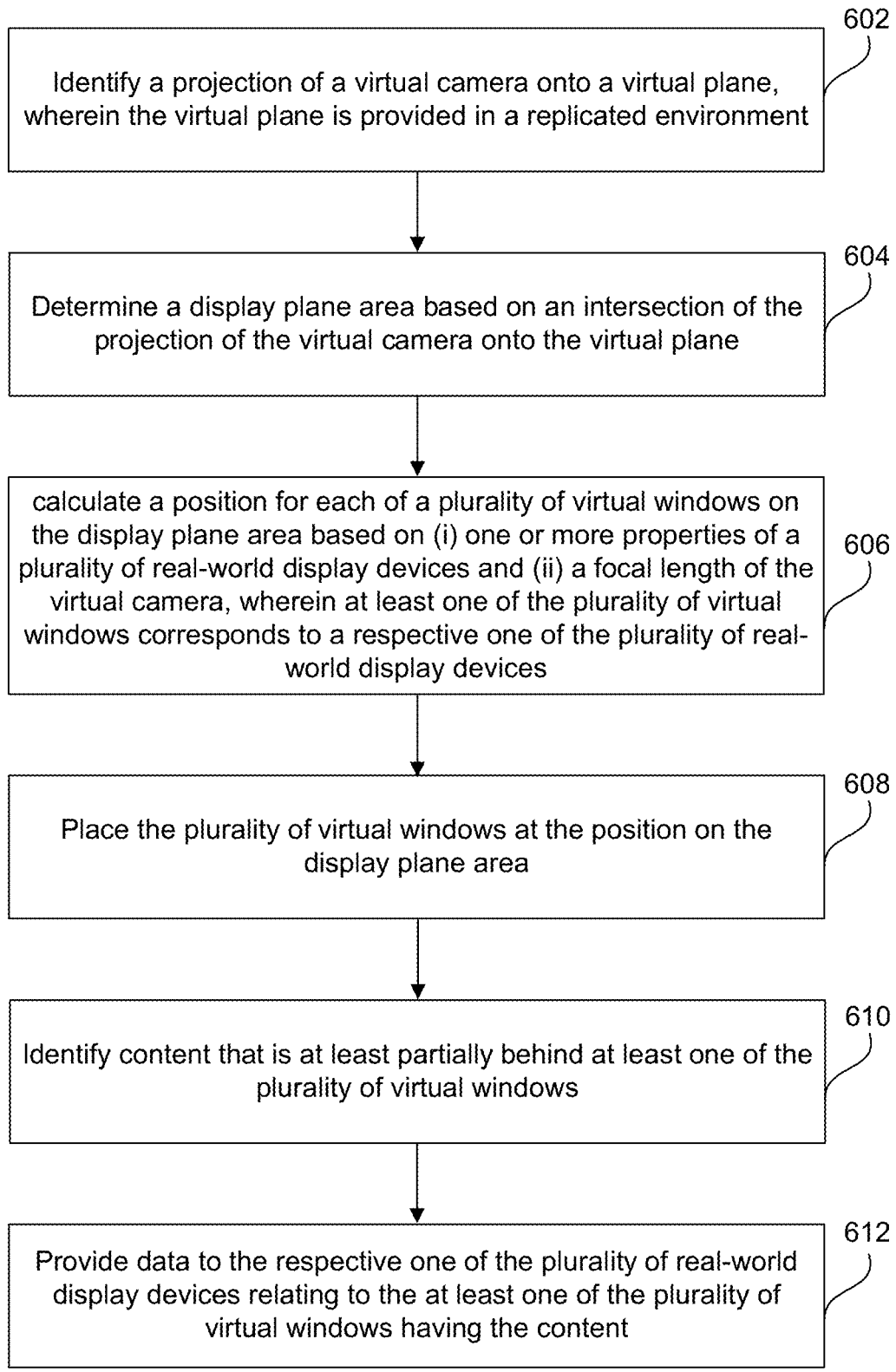

FIGS. 5 and 6 are flowcharts for methods 500 and 600 for providing a contiguous virtual space for a plurality of display devices, according to an embodiment. Methods 500 and 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 5 and 6, as will be understood by a person of ordinary skill in the art.

Referring now to FIG. 5, method 500 for providing a contiguous virtual space to only a single set of display devices 106, 108 and 110 (e.g., display devices 106) shall be described with reference to FIGS. 1 and 2. However, method 500 is not limited to that example embodiment.

In 502, the central server 102 acquires display information relating to one or more sets of real-world display devices 106, 108 and 110. As described above, each set of real-world display devices 106, 108 and 110 is provided to display the same video file. For example, as illustrated in FIG. 2, a set of display devices provide a contiguous virtual space 102 for viewers 204. As such, the central server 102 receives a position (e.g., in centimeters), a rotation (e.g., in degrees), a dimension (e.g., in centimeters), a resolution (e.g., in pixels), and an aspect ratio (e.g., in centimeters) of each display device in the set and the set itself.

In 504, the central server 102 determines if there is a single set of real-world display devices 106, 108 and 110 (e.g., only display devices 106) or multiple sets of display devices 106, 108 and 110 (e.g., display devices 106 and 108). If the central server 102 determines that there are multiple sets of display devices 106, 108 and 110, method 500 proceeds to 506. However, if the central server 102 determines there is only a single set of display devices 106, 108 and 110, method 500 proceeds to 508.

In 506, the central server 102 forwards content to be viewed on the display real-world devices 106, 108 and 110, along with timing data, to one or more local server(s) 104. To do so, the central server 102 sends timestamps and/or timecodes of the local servers 104. This will allow corresponding display devices of various sets multiple sets of display devices 106, 108 and 110 (e.g., display devices 106a and 108a) to present the same or similar data at the same time.

In 508, the central server 102 or the local servers 104 determines one or more properties of a replicated environment to be shared between each of the sets of the real-world display devices 106, 108 and 110 based on the content to be viewed on the display devices 106, 108 and 110.

Accordingly, in some embodiments, where there is a single set of display devices 106, 108 or 110 (e.g., display devices 106), the central server 102 or the respective local server 104 determines the properties of the particular set of real-world display devices 106, 108 or 110. In other embodiments, where there are multiple sets of real-world display devices 106, 108 and 110 (e.g., display devices 106 and 108), the local servers 104 determines the properties for their respective real-world display devices 106, 108 and 110.

In 510, the central server 102 or the local servers 104 creates a master virtual camera from virtual windows provided on a virtual plane and correspond to each set of real-world display devices. As discussed above, a master virtual camera may be provided for a virtual plane. And after determining the properties of the master virtual camera, a plurality of child virtual cameras may be provided that correspond to the virtual windows.

In 512, the central server 102 or the local servers 104 modifies the master camera's view port and/or its child camera's viewport based on properties relating a plurality of windows in the virtual environment.

In 514, the central server 102 or the local servers 104 receives data from the master or virtual camera based on their view of the content in the virtual windows 412.

In 516, the central server 102 or local servers 104 provides the data to the plurality of real-world display devices 106, 108 and 110 corresponding to the respective plurality of virtual windows 412.

As explained above, if there is a single set of display devices 106, 108 and 110 (e.g., display devices 106), the central server 102 or the appropriate local server (e.g., local server 104a) performs steps 508, 510 and 512. Along these lines, as stated above, the central server 102 and appropriate local server 104 may be combined into a single server. However, if there multiple sets of display devices 106, 108 and 110 (e.g., display devices 106 and 108), the local servers 104 receive the timing data from the central server 102 and perform steps 508, 510, 512 and 514 in accordance with the timing data.

Referring now to FIG. 6, method 600 shall be described with reference to FIGS. 1, 3, 4 and 5. However, method 600 is not limited to those example embodiments.

In 602, the central server 102 or local servers 104 identifies a projection 308 of a virtual camera 306 onto a virtual plane 302 provided in a replicated environment 300 (e.g., a replicated real-world or virtual environment).

In 604, the central server 102 or the local servers 104 determines a display plane area 310 based on an intersection of the projection 308 of the virtual camera 306 onto the virtual plane 302.

In 606, the central server 102 or the local servers 104 calculates a position for each of a plurality of virtual windows 412 provided on the display plane area 410 based on (i) one or more properties of a plurality of real world display device 106, 108 and 110 and (ii) a focal length of the virtual camera 402. Accordingly, each of the plurality of virtual windows 412 relates/corresponds to a respective one of the plurality of display devices 106, 108 and 110.

In 608, the central server 102 or the local servers 104 places the plurality of virtual windows 412 at the position on the display plane area 410.

In 610, the central server 102 or the local servers 104 identifies content that is at least partially behind at least one of the plurality of virtual windows 412. The content may be an object 304, which may be two- or three-dimensional.

In 612, the central servers 102 or the local servers 104 provide data to the respective one of the plurality of display devices 106, 108 and 110 relating to the at least one of the plurality of virtual windows 412 having the content.

As described above with respect to FIG. 6, steps 602, 604, 606, 608, 610 and 612 may be performed by the central server 102 and/or the local servers 104. For example, in some embodiments, steps 602, 604, 606, 608, 610 and/or 612 are performed by the central server 102 and provided to the local server 104.

Figure 7:
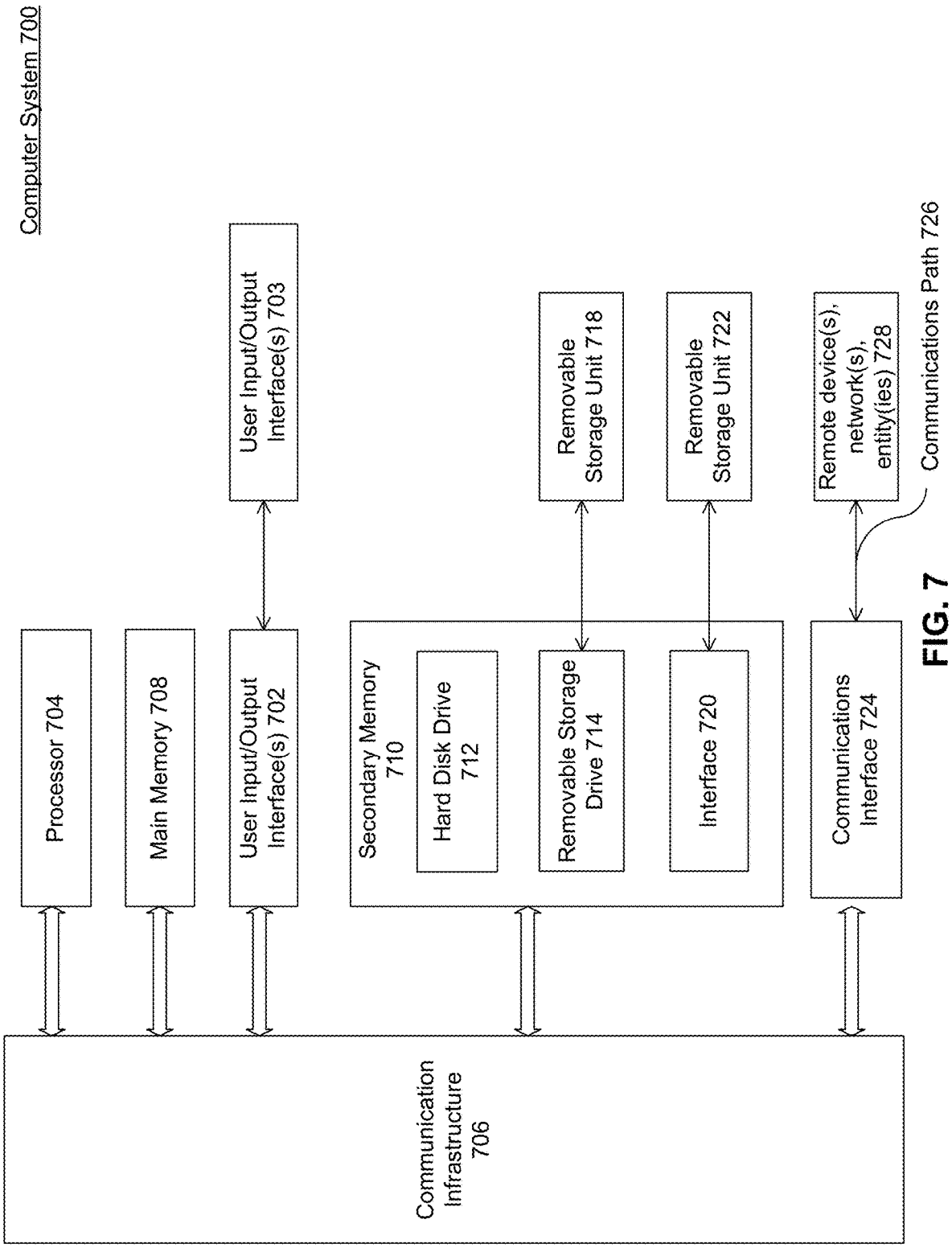
FIG. 7 illustrates an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/or any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for presenting a video across a plurality of display devices within a real-world environment, the method comprising:
replicating, by at least one processor, a spatial configuration of the plurality of display devices within the real-world environment onto a virtual plane in a virtual environment;
placing, by the at least one processor, a master virtual camera within the virtual environment to project the video onto the virtual plane to define a display plane area in the virtual plane;
placing, by the at least one processor, a plurality of virtual windows within the display plane area in the virtual environment that correspond to the spatial configuration of the plurality of display devices;
placing, by the at least one processor, a plurality of child virtual cameras within the virtual environment that correspond to the plurality of virtual windows to capture a plurality of portions of the video that is projected onto the plurality of virtual windows by the master virtual camera;
generating, by the at least one processor, a plurality of data streams that correspond to the plurality of portions of the video captured by the plurality of child virtual cameras; and
providing, by the at least one processor, the plurality of data streams to the plurality of display devices to be displayed by the plurality of display devices in the real-world environment.

2. The method of claim 1, wherein the replicating comprises:
replicating the spatial configuration of the plurality of display devices within the real-world environment based upon one or more properties of the plurality of display devices.

3. The method of claim 2, wherein the one or more properties of the plurality of display devices comprise:
a plurality of geographical positions of the plurality of display devices on a real-world plane in the real-world environment;
a plurality of spatial distances between the plurality of display devices in the real-world environment;
a plurality of display resolutions of the plurality of display devices;
a plurality of physical sizes of the plurality of display devices;
a plurality of technology types of the plurality of display devices; or
a plurality of display types of display devices.

4. The method of claim 1, wherein the placing comprises:
spatially placing the plurality of virtual windows onto the display plane area in the virtual environment that correspond to the spatial configuration of the plurality of display devices within the real-world environment.

5. The method of claim 4, wherein the spatially placing comprises:
calculating a plurality of spatial positions for the plurality of virtual windows based on one or more properties of the plurality of display devices and a focal length of the master virtual camera.

6. The method of claim 1, wherein the placing comprises:
placing the plurality of child virtual cameras within the virtual environment to crop the video into the plurality of portions.

7. The method of claim 1, wherein the projecting comprises:
defining the display plane area in the virtual plane to be an intersection of between the projected video and the virtual plane.

8. The method of claim 1, wherein adjacent display devices from among the plurality of display devices within the real-world environment are separated from one another to provide a noncontiguous viewing area between the adjacent display devices, and
wherein the replicating comprises:
replicating the noncontiguous viewing area between the adjacent display devices onto the virtual plane to provide a contiguous virtual plane in the virtual environment for projecting the video.

9. The method of claim 1, wherein the generating comprises:
generating the plurality of data streams to include timing data to synchronize the plurality of display devices, and
wherein the providing comprises:
providing the timing data to the plurality of display devices to synchronize display of the plurality of portions among the plurality of display devices in the real-world environment.

10. A server for presenting a video across a plurality of display devices within a real-world environment, the server comprising:
a memory that stores instructions; and
a processor configured to execute the instructions, the instructions, when executed by the processor, configuring the processor to:
replicate a spatial configuration of the plurality of display devices within the real-world environment onto a virtual plane in a virtual environment,
place a master virtual camera within the virtual environment to project the video onto the virtual plane to define a display plane area in the virtual plane,
place a plurality of virtual windows within the display plane area in the virtual environment that correspond to the spatial configuration of the plurality of display devices,
place a plurality of child virtual cameras within the virtual environment that correspond to the plurality of virtual windows to capture a plurality of portions of the video that is projected onto the plurality of virtual windows b the master virtual camera,
generate a plurality of data streams that correspond to the plurality of portions of the video captured by the plurality of child virtual cameras; and
provide the plurality of data streams to the plurality of display devices to be displayed by the plurality of display devices in the real-world environment.

11. The server of claim 10, wherein the instructions, when executed by the processor, configure the processor to:
replicate the spatial configuration of the plurality of display devices within the real-world environment based upon one or more properties of the plurality of display devices.

12. The server of claim 11, wherein the one or more properties of the plurality of display devices comprise:
a plurality of geographical positions of the plurality of display devices on a real-world plane in the real-world environment;

a plurality of spatial distances between the plurality of display devices in the real-world environment;

a plurality of display resolutions of the plurality of display devices;

a plurality of physical sizes of the plurality of display devices;

a plurality of technology types of the plurality of display devices; or a plurality of display types of display devices.

13. The server of claim 10, wherein the instructions, when executed by the processor, configure the processor to:

spatially place the plurality of virtual windows onto the display plane area in the virtual environment that correspond to the spatial configuration of the plurality of display devices within the real-world environment.

14. The server of claim 13, wherein the instructions, when executed by the processor, configure the processor to:

calculate a plurality of spatial positions for the plurality of virtual windows based on one or more properties of the plurality of display devices and a focal length of the master virtual camera.

15. The server of claim 10, wherein the wherein the instructions, when executed by the processor, configure the processor to:

place the plurality of child virtual cameras within the virtual environment to crop the video into the plurality of portions.

16. The server of claim 10, wherein the instructions, when executed by the processor, configure the processor to:

define the display plane area in the virtual plane to be an intersection of between the projected video and the virtual plane.

17. The server of claim 10, wherein adjacent display devices from among the plurality of display devices within the real-world environment are separated from one another to provide a noncontiguous viewing area between the adjacent display devices, and wherein the instructions, when executed by the processor, configure the processor to:

replicate the noncontiguous viewing area between the adjacent display devices onto the virtual plane to provide a contiguous virtual plane in the virtual environment for projecting the video.

18. A server for presenting a video across a plurality of display devices within a real-world environment, the server comprising:

a memory that stores instructions; and a processor configured to execute the instructions, the instructions, when executed by the processor, configuring the processor to:

replicate a spatial configuration of the plurality of display devices within the real-world environment onto a plurality of virtual planes in a virtual environment, each virtual plane from among the plurality of virtual planes corresponding to a set of display devices from among a plurality of sets of display devices, place a plurality of master virtual cameras within the virtual environment to project the video onto the plurality of virtual planes to define a plurality of display plane areas in the virtual plane, place a plurality of virtual windows within the plurality of display plane areas in the virtual environment that correspond to the spatial configuration of the plurality of display devices, place a plurality of child virtual cameras within the virtual environment that correspond to the plurality of virtual windows to capture a plurality of portions of the video that is projected onto the plurality of virtual windows by the plurality of master virtual cameras, generate a plurality of data streams that correspond to the plurality of portions of the video captured by the plurality of child virtual cameras; and provide the plurality of data streams to the plurality of display devices to be displayed by the plurality of display devices in the real-world environment.

19. The server of claim 18, wherein the instructions, when executed by the processor, configure the processor to:

replicate the spatial configuration of the plurality of display devices within the real-world environment based upon one or more properties of the plurality of display devices.

20. The server of claim 18, wherein the instructions, when executed by the processor, configure the processor to:

spatially place the plurality of virtual windows onto the plurality of display plane areas in the virtual environment that correspond to the spatial configuration of the plurality of display devices within the real-world environment.

21. The server of claim 20, wherein the instructions, when executed by the processor, configure the processor to:

calculate a plurality of spatial positions for the plurality of virtual windows based on one or more properties of the plurality of display devices and a plurality of focal lengths of the plurality of master virtual cameras.

22. The server of claim 18, wherein the wherein the instructions, when executed by the processor, configure the processor to:

place the plurality of child virtual cameras within the virtual environment to crop the video into the plurality of portions.

23. The server of claim 18, wherein the instructions, when executed by the processor, configure the processor to:

define the plurality of display plane areas in the virtual plane to be a plurality of intersections of between the projected video and the plurality of virtual planes.

* * * * *

UNITED STATES PATENT AND TRADEMARK OFFICE
CERTIFICATE OF CORRECTION

PATENT NO. : 12,143,559 B2  
APPLICATION NO. : 17/201949  
DATED : November 12, 2024  
INVENTOR(S) : Ragan et al.

Page 1 of 1

It is certified that error appears in the above-identified patent and that said Letters Patent is hereby corrected as shown below:

In the Claims

In Column 12, Claim 10, Line 50, delete "b" and insert -- by --, therefor.

In Column 13, Claim 15, Line 22, delete "wherein the wherein the" and insert -- wherein the --, therefor.

In Column 14, Claim 22, Line 43, delete "wherein the wherein the" and insert -- wherein the --, therefor.

Signed and Sealed this
Seventeenth Day of December, 2024

Derrick Brent
*Acting Director of the United States Patent and Trademark Office*